United States Patent

Carmel et al.

Patent Number: 5,841,432
Date of Patent: Nov. 24, 1998

[54] METHOD AND SYSTEM OF BUILDING AND TRANSMITTING A DATA FILE FOR REAL TIME PLAY OF MULTIMEDIA, PARTICULARLY ANIMATION, AND A DATA FILE FOR REAL TIME PLAY OF MULTIMEDIA APPLICATIONS

[76] Inventors: Sharon Carmel, 25 Kakal Street; Tzur Daboosh, 236 David Ben-Gurion Street, both of Givataim; Eli Reifman, 19 Nordau Street, Rishon Le-Zion; Naftali Shani, 6 Hamishna Street, Telaviv, all of Israel, 62917

[21] Appl. No.: 594,890

[22] Filed: Feb. 9, 1996

[51] Int. Cl.⁶ .................................................. G06T 1/00
[52] U.S. Cl. ................ 345/302; 395/200.66; 395/200.61
[58] Field of Search ...................... 395/806, 173, 395/175, 950, 951, 955, 200.66, 200.61, 682; 348/17, 18; 345/302

[56] References Cited

U.S. PATENT DOCUMENTS

| | | | |
|---|---|---|---|
| 5,483,287 | 1/1996 | Siracusa | 348/426 |
| 5,493,638 | 2/1996 | Hooper et al. | 395/135 |
| 5,517,652 | 5/1996 | Miyamoto et al. | 395/200.49 |
| 5,519,828 | 5/1996 | Rayner | 395/326 |
| 5,537,528 | 7/1996 | Takahashi et al. | 395/773 |
| 5,590,262 | 12/1996 | Isadore-Barreca | 395/806 |
| 5,610,841 | 3/1997 | Tanaka et al. | 364/514 R |
| 5,619,636 | 4/1997 | Sweat et al. | 395/806 |
| 5,694,334 | 12/1997 | Donahue et al. | 364/514 R |
| 5,708,845 | 1/1998 | Wistendahl et al. | 345/302 |

OTHER PUBLICATIONS

CorelDRAW User's Manual–Version 4.0, 1993, pp. 413–458, 1993.

*Primary Examiner*—Joseph H. Feild
*Attorney, Agent, or Firm*—Hoffman, Wasson & Gitler

[57] ABSTRACT

A compressed data file for real time display of multimedia applications, e.g., animation, on a network is disclosed. The file includes general information about the animation. Also included in the file are complete segment blocks of information representing single frames in the animation. Each frame is made up of multiple images (layers) which are overlapped. Each image is made up of vector objects. Display of the file is conducted through asynchronous transfer of data so that as a frame is displayed, the next frame is transmitted and received by an end user for immediate display.

3 Claims, 6 Drawing Sheets

METHOD AND SYSTEM OF BUILDING AND TRANSMITTING A DATA FILE FOR REAL TIME PLAY OF MULTIMEDIA, PARTICULARLY ANIMATION, AND A DATA FILE FOR REAL TIME PLAY OF MULTIMEDIA APPLICATIONS

FIELD OF THE INVENTION

This invention relates to a method and system for building data files for transmission over a network for display to an end user in real time. More particularly, the invention relates to such a file and system for use on a network which is more commonly known as global computer networks connected by common protocols, such as the network known by the term "Internet." The data transmitted, in accordance with the invention, is transmitted using an asynchronous transfer of data through the existing transfer of data protocol of the network, which in the case of the Internet, such a transfer protocol, is known as an FTP, i.e., file transfer protocol.

BACKGROUND OF THE INVENTION

The invention relates to a method of building data files, the data files built, and the transfer of data from such files for the purposes of delivering real time animation to an end user, and the real time display to an end user, over a network, particularly global computer networks connected by common protocols, such as the Internet.

For purposes of this disclosure, by the term "network" is meant at least two computers connected through a physical communication line which can be hardwired, or virtual, such as satellite or other wireless communications. A computer can mean a personal computer, server, or other similar-type device capable of receiving, transmitting, and/or manipulating data for such purposes as, but not limited to, display on a display unit connected thereto.

Presently there are no standards for real time transmission and display of multimedia programs and/or applications on such global computer networks such as the Internet. The reason why such real time transmissions and displays are not possible, is that the data transfer rates necessary for multimedia applications are measured in 50 to 110 kilobytes per second, whereas the average data transfer lines in such networks, for an end user having a 14.4 b.p.s. modem, can only handle a maximum of 1 to 1.5 kilobytes per second. Thus, real time transmission and display of multimedia applications, such as animation, is impossible because of the physical limitations of existing wiring when considering present-day modem compression techniques.

Thus, the present invention avoids the limitations of the prior art and provides a system, data format, and method of conveying and operating on data over a network to provide real time multimedia play, including display, particularly, a real time display of animation.

SUMMARY OF THE INVENTION

In one aspect, the invention is directed to storage media containing data for playing multimedia applications, particularly for display of animation. The storage media includes a first block of data made up of general information for an entire animation file. A plurality of segment information blocks make up the rest of the data for displaying the animation.

Each segment information block is made up of a first and a second section. The first section of the segment information block includes general information data about a segment, including data identifying the frame identification for the respective segment, and data identifying the number of layers in the frame. The first section also includes data making up information about each layer in the frame, including data identifying the layer identification for the respective frame, data identifying the image, data defining the placement of the layer on the frame, and ink data.

The second section is made up of image data, for each image in a frame, and includes image identification data, background color data, width and height of image data, and data identifying the number of objects in the respective image. The second section also includes object data for each object, which is made up of identification of object-type data, enclosing rectangle data, fill-in background and foreground data, fill-pattern data, pen-pattern data, line-size data, and ink data.

In another aspect, the invention is directed to a method of building a data file for use in displaying real time animation. The method includes the steps of building images by storing of vector objects in an image data file. The built images are displayed in windows as "thumbnails," hereinafter defined. The respective frames of the animation are built by positioning images in a stage window for each frame. A time line is then defined for the frames by at least one of: 1) sequentially arranging the frames; or 2) for frames having a common image, constructing a start frame and an end frame using the common image, leaving (1–n) empty frames between the defined start and end frame, and using a predetermined function, as will be readily apparent to those skilled in the art, to create the remaining frames from the empty frames, from the common image. This is known as an "in-betweening" function, as will be readily apparent to those skilled in this art. The transparency ink for the frame data is then defined, and the data is stored as animation file for later transmission of the data file and display of an animation in real time.

In yet still another aspect, a method of the invention includes a method of displaying real time multimedia data, in particular, animation, from data stored on storage media, as previously described. The method includes the steps of, through asynchronous transmission, retrieving and storing the first block of data which is comprised of general information. Retrieving the first segment of information block of a plurality of segment information blocks, and when a full segment information block is retrieved, displaying a frame of the animation while simultaneously retrieving the next segment information block as the frame of the animation is displayed. These steps are then repeated until the number of frames in the animation defined in the first block of data has been retrieved and displayed.

BRIEF DESCRIPTION OF THE DRAWINGS

Having briefly described the invention, the same will become better understood from the following detailed discussion, taken in conjunction with the drawings, wherein.

DETAILED DISCUSSION OF THE INVENTION

Figure 1:
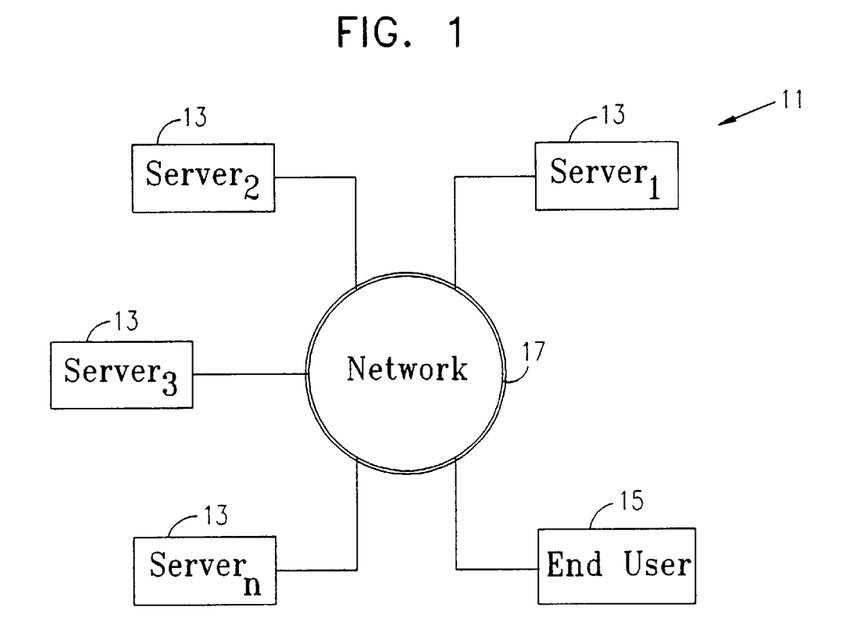
FIG. 1 is a schematic diagram of a network of the type in which the invention is implemented, particularly global computer networks connected by common protocols such as the Internet.

FIG. 1 illustrates a typical network on which the invention can be implemented. As noted previously, for purposes of this disclosure, the term "network" shall mean at least two computers connected for communications through communication lines which can be hard wired or virtual, such as satellite communications. In a more preferred form, the invention is implemented on global computer networks made up of multiple networks connected by common protocols, such as the network presently known as the "Internet." Such a network consists of multiple computers, including, for example, but not limited to such devices as servers, and end user computers, such as personal computers, all connected through telephone lines, or other communication links, both physical and wireless.

As previously explained, in order to achieve a display of real time, multimedia applications such as animation, average data transmission rates of 50 to 100 kilobytes per second are required, while current existing telephone lines are only capable of handling 1 to 1.5 kilobytes per second. Thus, achieving real time display of animation with current data carrying capabilities is impossible.

As illustrated in FIG. 1, a network 11, of the type on which the invention may be implemented, consists of plural network interconnections 17, and multiple computers such as servers 13, identified as servers $13_1$–$13_n$, and end user computers, such as computer 15.

Figure 2:
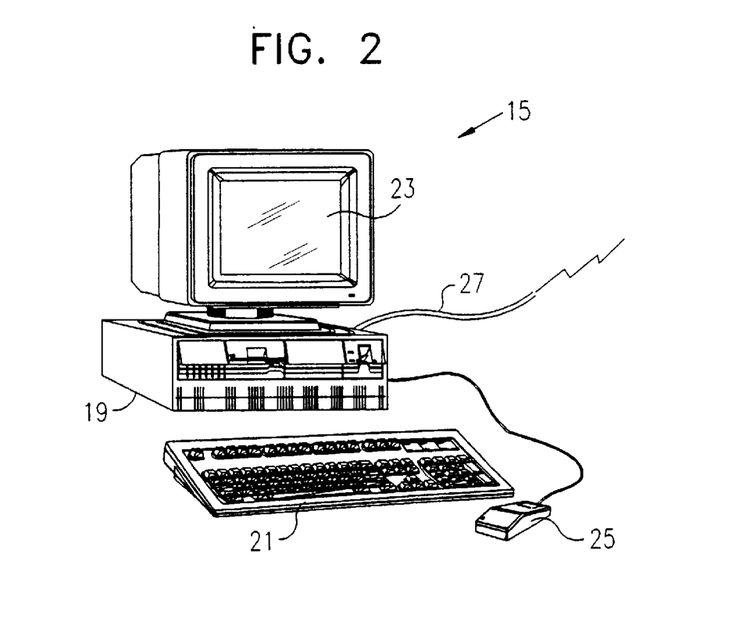
FIG. 2 illustrates a typical end user computer on which the multimedia software, particularly animation, in accordance with the invention, can be operated and displayed.

A typical end user computer 15, as further illustrated in FIG. 2, will include a main computer unit 19, with peripherals such as a keyboard 21, mouse 25, and display 23 connected thereto. Computer 19 may be connected by a telephone line 27, either physically or through wireless connections, to the network interconnections 17 of FIG. 1.

Figure 3:
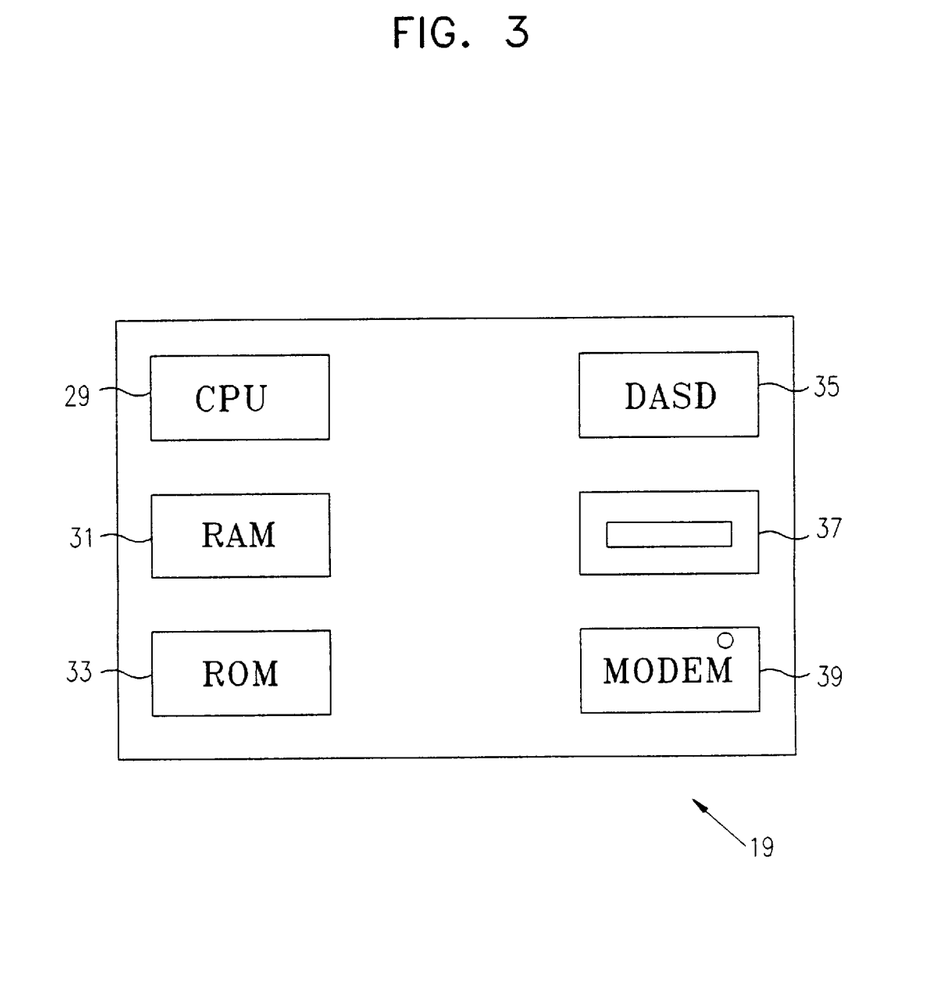
FIG. 3 illustrates a typical computer and the components thereof on which the invention can be implemented.

As further illustrated in FIG. 3, the main computer portion 19 includes, and this is equally applicable to servers 13 of FIG. 1, typically a central processing unit 29 connected to random access memory 31 and read only memory 33. Random access memory 31 is used to download programs and to operate the computer unit 19, in cooperation with the central processing unit 29. Read only memory 33 includes certain computer routines configuring how the computer operates such as its basic input/output system (BIOS). The computer 15 can also include a direct access storage device 35, such as a hard drive, as well as a removable storage media drive 37 for floppy discs and/or CD ROM applications. A modem 39 serves to connect the computer 19 to the network 17.

In order to implement the invention, which includes a method of building a multimedia file, such as an animation file, the animation file itself and a method of transmitting and using the animation file to display a real time multimedia application, such as an animation, it becomes necessary to cut down the information passed through the network down to the minimum required for display of an animation file on a frame-by-frame basis. Thus, in accordance with the invention, each complete information unit that is sufficient to display a frame, will be defined as a "segment" hereafter. By using the techniques of the invention, data transmission rates can be kept to about no more than 200 bytes per second, well below current data transmission rate capability limits.

Figure 4:
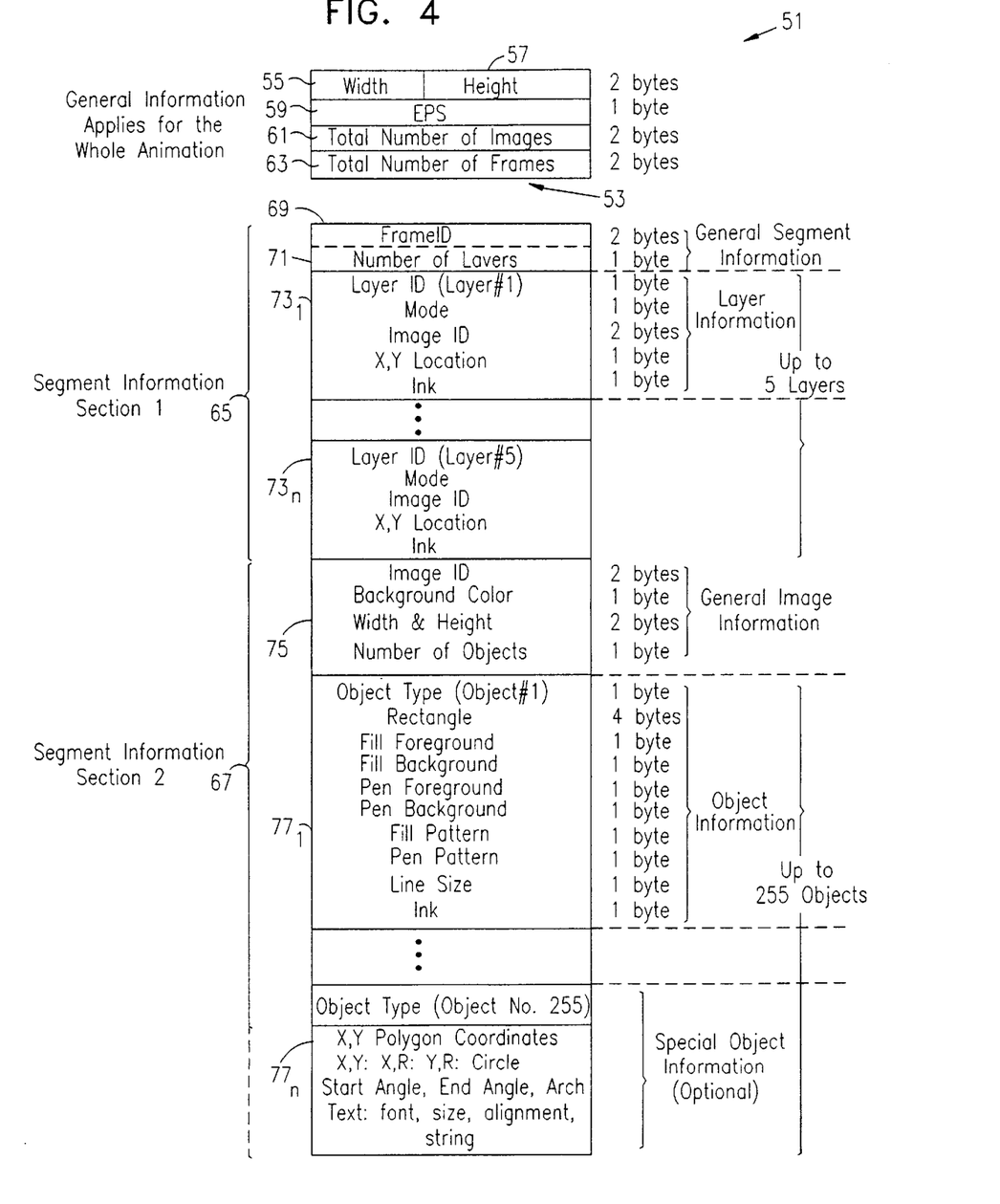
FIG. 4 is a block diagram illustrating a multimedia, specifically, animation, file formatted in accordance with the invention.

Referring now to FIG. 4, a typical animation file formatted in accordance with the invention is illustrated.

The animation file, in accordance with FIG. 4, is generally designated with the number 51, and includes a first block of information 53. The first block of information which is passed to an end user over the network through asynchronous FTP, i.e., file transfer protocol, in a manner which is conventional and well known to those in the art, contains general information about the animation and includes information about the width 55 and height 57 of the animation display. The width 55 and height 57 information typically consists of no more than 2 bytes. A record 59 defines the frames per second or rate of displaying frames and is typically made up of no more than 1 byte. Record 61 defines the total number of images and makes up no more than 2 bytes, while record 63 identifies the total number of frames and makes up no more than 2 bytes.

For purposes of this disclosure, it should be noted that a "frame" consists of a complete picture which is displayed as part of a sequence of multiple frames in the animation. Each frame is made up of layers, and in the present form of the invention, can be up to 5 layers, although it is contemplated, as will be readily apparent to those of ordinary skill in the art, that up to 200 layers can be provided. The layers can be made up of images, or can simply be a layer without an image. Thus, when each layer is an image, then a frame can be made up of up to five images in the current embodiment, and more, as may be apparent to those of ordinary skill in the art. Each image is itself made up of objects, which, as explained hereafter, are vector objects consisting of polygons, circles, or other such shapes.

In accordance with the invention, after an end user receives the general information block, the block is stored by the end user computer for use during display of the animation. Segment blocks are then transmitted to the end user. As noted, each complete information unit that will be used to display a frame is, for purposes of this disclosure, called a segment.

Thus, in operation, after receiving the general information block 53, an end user then receives segment blocks coming sequentially, one after each other, until the end of the animation. The advantage of knowing from the general information block 53 the total number of frames in animation, is that a delimiter need not be set after each complete segment is received in order to terminate the program after a predetermined number of segments count has been reached.

In order to know when a full segment has been loaded that can be displayed, two bytes are transmitted before each segment to identify the length of the segment. This segment information is part of segment information section 65 and is identified as frame identification information 69. In this manner, time is saved as the system need not check, with conditional code, each and every byte for a segment delimiter, but instead, a predetermined amount of data is read initially in advance. Thus, upon receiving a complete segment information, a subroutine is executed at the end user to display the specific frame received on the screen. Simultaneously, the next segment is being transmitted through an asynchronous FTP.

As previously discussed, each segment is constructed as two sections. Section one is the general segment information section 65 and includes the previously discussed frame identification (ID) information 69, made up of up to 2 bytes, and information 71 identifying the number of layers, and making up approximately 1 byte of information. Layer information is also provided in the form of layer information blocks $73_1$–$73_n$, with each layer information box 73 providing a layer identification (ID) number. In this regard, the layer identification (ID) number will be 0 if the layer is identical to the previous one.

If the layer is not identical to the previous one, then the layer identification (ID) will be made up of 1 byte. A mode identification (ID), which is reserved for implementing interactivity functions, consists of 1 byte, and an image identification (ID) used to identify a particular image, and consisting of up to 2 bytes of information, is also provided. The X,Y locations of the particular layer are also provided in the form of X and Y coordinates and is made up of general information of up to 4 bytes, and ink information for the layer, made up of up to 1 byte, is also provided.

The second segment information section 67 provides general image information and includes a first block 75 which includes the image identification (ID), which is made up of up to 2 bytes, background color which is made of up to 1 byte, width and height information which is made up of up to 2 bytes, and number of objects in the image which is made up of up to 1 byte.

There can be up to 255 objects in an image and object information is passed in the form of blocks $77_1$–$77_n$. Each object block 77 includes a definition of the object type, for example, whether the object is a rectangle or circle, and this information is made up of up to 1 byte. A definition of an enclosing rectangle for the object, i.e., the minimum size rectangle within which a particular object can be fit, made up of up to 4 bytes, is also provided. In addition, the fill-in color information for the foreground and the background is provided and is made up of up to 2 bytes. The pen color for the foreground and the background is also provided and each is made up of up to 2 bytes. The fill pattern, as well as the pen pattern is also provided, each respectively made up of up to 1 byte. Finally, line size and pixel information, making up to 1 byte each, is also provided as well as ink information, making up to 1 byte, for a total of 13 bytes per object.

In addition to the object information, optional special information can be provided such as a sequence of X and Y coordinates for polygonal shapes, if any. Other types of special information includes "center/X radius, Y-radius" information if the object is a circle, or "center plus start angle and end angle" information if the object is an arch. In addition, text information, including color, size, font, alignment, and text itself, can also be provided.

It will be appreciated by those of ordinary skill in the art that the animation file, in accordance with the invention, can be further compressed to accommodate both sound and interactivity functions. Specifically, further compression of data, once the basic concept described above is known, can be achieved by currently available character and ASCII compression techniques using conventional pattern recognition. By achieving such a compression, sound can then be provided with the animation file.

Sound data, as is readily apparent, is the same as animation data in that it is pure digital data. Thus, to provide sound capabilities with the compressed data format of the invention, conventional sound transmission techniques, such as those currently commercially available from Real Audio Co., can be displayed.

In addition, interactivity can be provided in the system. This is done by modifying the architecture to accept inputs such as a clicking on a mouse, or after a period of time has expired. The software resident at the end user computer can be modified to define "hot" areas on a screen so that, e.g., when a user with a mouse clicks on the hot area, the asynchronous transmission is terminated and diverted to another asynchronous activity.

An example of such an interactivity change may involve clicking on a game character to shoot another game character. If a bullet hits the other game character, the file transfer is aborted and a new transfer may commence showing the character hit by the bullet and falling.

Figure 5A:
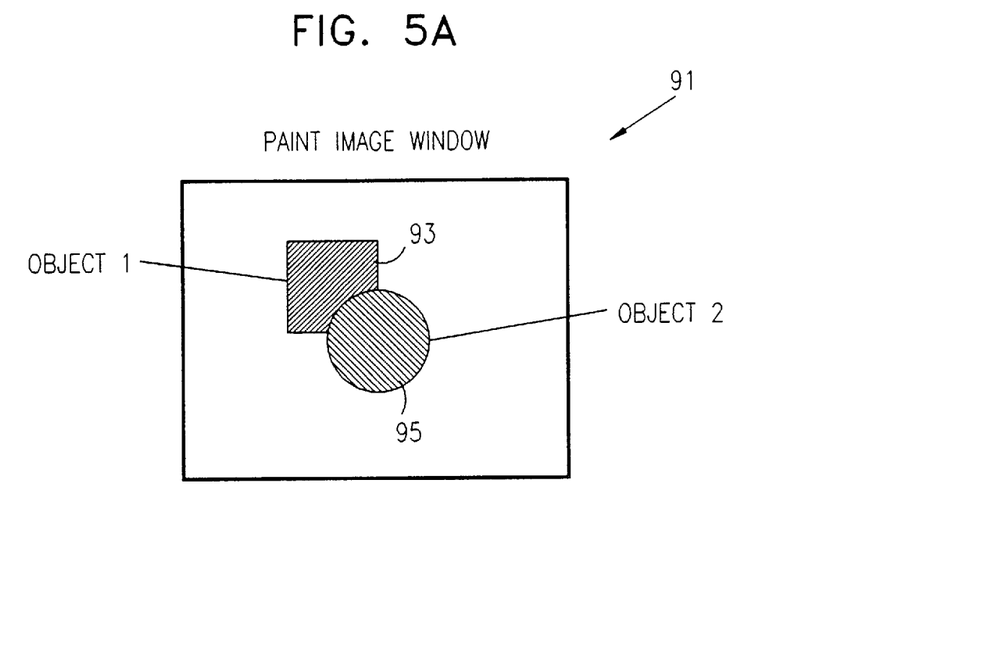
FIGS. 5a and 5b, respectively, illustrate an image paint window, and a tools window, in accordance with the invention, which are used for creating the multimedia, i.e., animation, file, in accordance with the system of the invention.
Figure 5B:
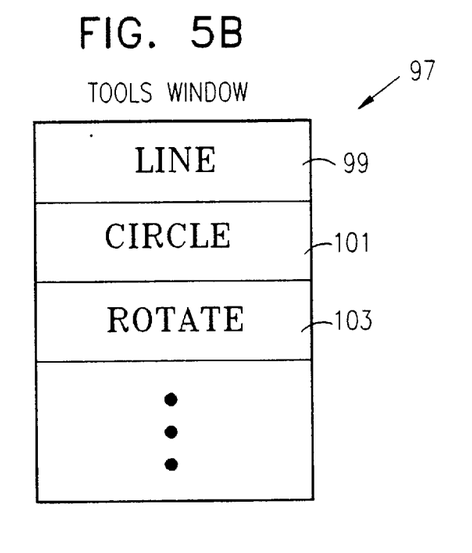

Having described the general format of an animation file, created in accordance with the process of the invention, the following describes how such a file is to be built. Specifically, reference is made to FIGS. 5*a* and 5*b*. FIG. 5*a* illustrates, in schematic form, an image paint window. FIG. 5*b* illustrates a tools window, implemented in accordance with the editor program of the invention, which allows construction of an animation file.

In accordance with the process employed by the editor program of the invention, an image paint window 91 is set up on a computer display on which the animation is being built. A person using the editor draws an image in the image window 91. The image is constructed out of vector objects 93 and 95, for example, a polygon and a circle. This is done by using conventional vector drawing tools and functions from the tool window 97 of FIG. 5*b*, as illustrated, for example, by tool function line 99, circle 101, and rotate 103, as will be readily apparent to one of ordinary skill in the art.

In implementing the editor of the invention, it will be apparent to those of ordinary skill in the art that there are currently over seventy conventional vector tools and functions readily available for creating drawings, such as a line, rectangle, circle, polygon, etc. Additional functions such as rotation, distortion, etc. can be applied to the vector objects in a conventional manner. The objects are generated in an overlay environment. As such, the objects can be shuffled back and forth with respect to each other to create different overlays and overlapping effects.

After the image is completed, it is stored as a single unit. As such, the objects constructed cannot be individually manipulated during the animation, and they form a fixed portion of the image.

Figure 6:
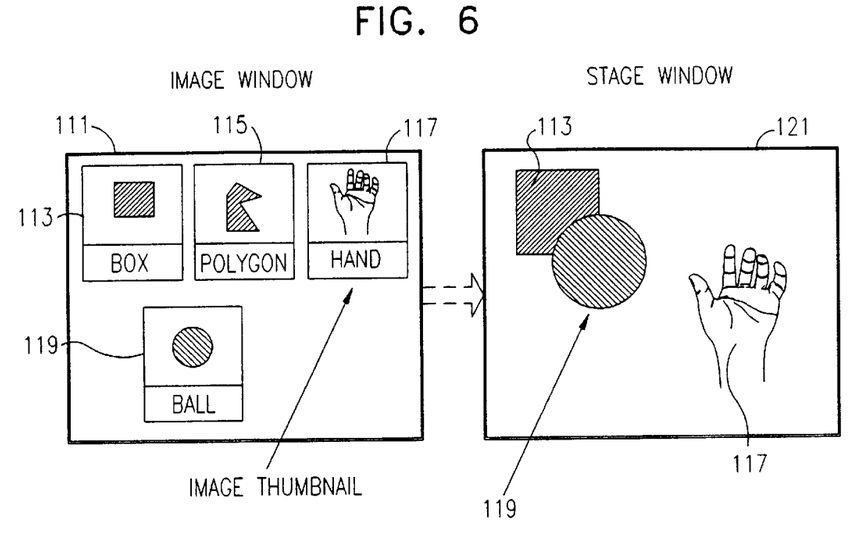
FIG. 6 is a two-part diagram illustrating how an image window with image thumbnails created, in accordance with the invention, is used to create a stage window having numerous objects therein as images.
Figure 7:
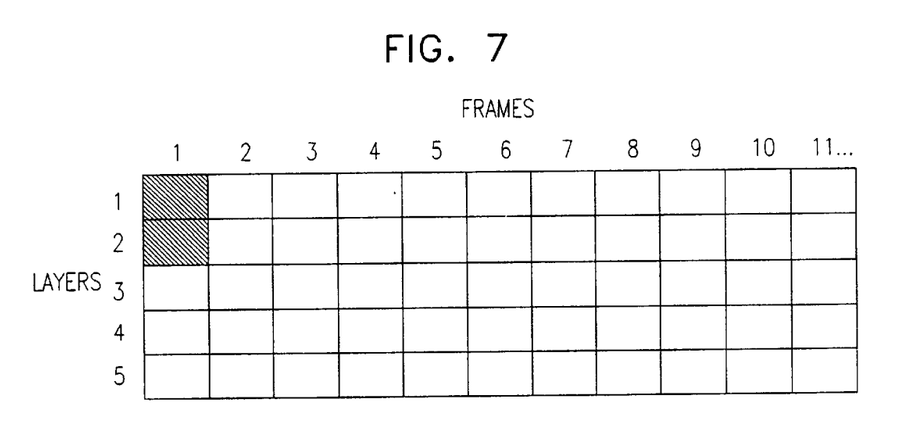
FIG. 7 is a time-line window illustrating how the frames and layers of the animation in accordance with the invention are assembled.

FIG. 6 illustrates construction of a stage window from images which have been created and are displayed on an image window. The image window 111 displays images 113–119 as image thumbnails, i.e., as captioned thumbnails, as will be readily apparent to those of ordinary skill in the art. A frame is then constructed by dragging the image thumbnails into a stage window 121 which, as illustrated, shows images 117 and 119, after dragging into the stage window 121. The stage window 121 emulates the actual stream portion that the animation will be played on. The frames and layers created are then assembled in a time-line window, as generally illustrated in FIG. 7.

Figure 8:
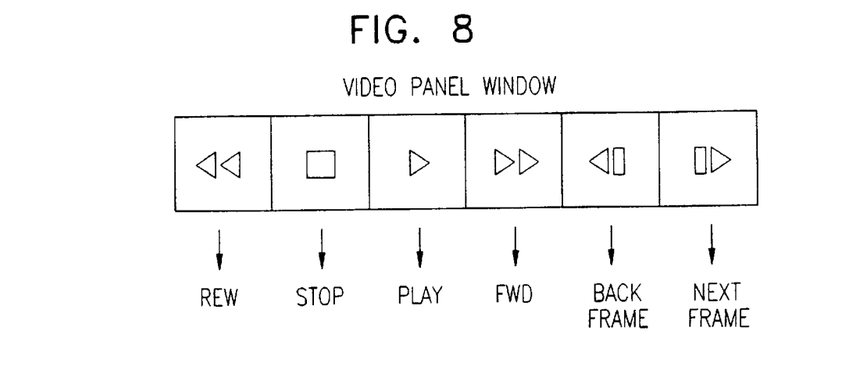
FIG. 8 illustrates a typical video-panel window which can be used by an animation creator, using the editor software of the invention, to review created animation at all times prior to completing creation of an animation file.

Having thus created animation, the person using the editor program can then review the animation using a video panel window, as created in a touch screen form, in a conventional manner, as illustrated in FIG. 8, similar to the functions provided on a tape player.

Figure 9:
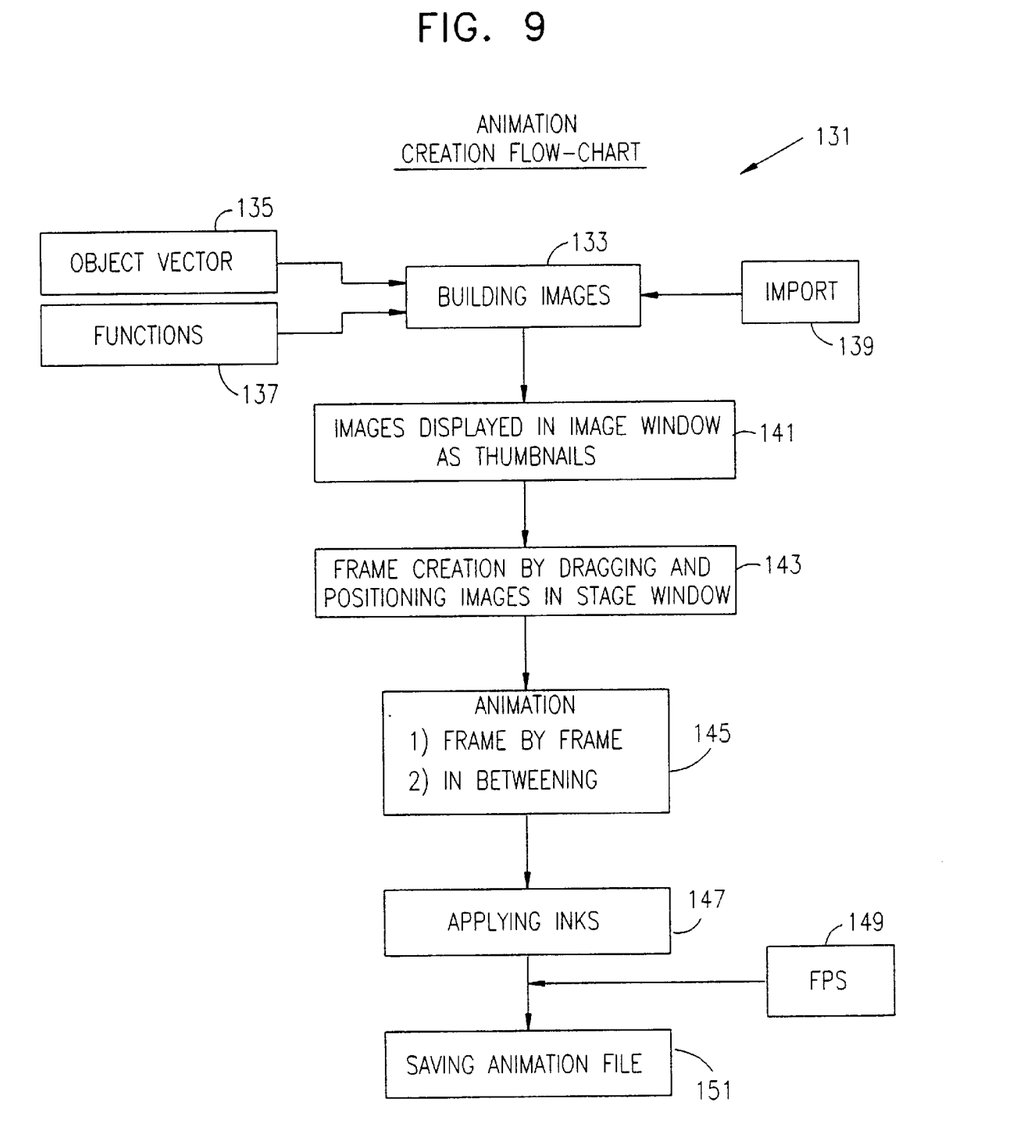
FIG. 9 is a flow chart illustrating how the system, in accordance with the invention, can be used to create an animation file.

Thus, as further illustrated in the flow chart of FIG. 9, the animation, in accordance with the invention, is created in accordance with the flow chart 131 of FIG. 9. As shown in FIG. 9, the first step of creating an animation file involves building images at a step 133, as previously described. The images can be built by importing objects, specifically, vector objects 135, functions 137, which create the objects, or alternatively, objects created by conventional software and imported at a step 139. At step 141, the images are then displayed in an image window as thumbnails. A frame is then created at step 143 by dragging and positioning images in the stage window. The animation is then created at step 145 on a frame-by-frame basis, or by using an "in-between" function. The in-between function is hereafter described. Ink is then applied at step 147, and after constructing the animation sequence, the frame per/second rate for the animation is encoded into the file at step 149, and the entire animation file, in a format in accordance with the invention, is then saved at step 151.

By "in between" function is meant a conventional technique which takes a base set of data and avoids repeating it in a manner duplicating it for repetitive instances in which it appears in a file. An example of how an "in between" function is implemented can be a first frame showing an object such as a ball in an upper right location. The last frame shows the ball in the lower left location. The "in between" function is used to generate images of the ball in transition from one frame to the next in either a linear progression, or exponential progression, depending upon the type of function chosen, as will be readily apparent to those of ordinary skill in the art.

Having thus described the invention, the same will become better understood from the following claims viewed in a non-limiting manner.

What is claimed is:

1. A method for conveying a multimedia program from a source computer to a destination computer, comprising:

providing at the source computer a series of data segments, including a predetermined number of such data segments, each data segment corresponding to a frame displayed in the multimedia program;

producing a general information block including information indicative of the predetermined number of data segments in the series;

transmitting the general information block to the destination computer; and transmitting the series of data segments to the destination computer, such that the destination computer executes the program and terminates the program responsive to the information in the general information block after the predetermined number of segments has been reached, wherein transmitting the series comprises transmitting the series of data segments substantially without setting a segment delimiter.

2. A method according to claim 1, wherein transmitting the series comprises transmitting each of the data segments in the series while the frame corresponding to a previous one of the data segments is displayed at the destination computer.

3. A method according to claim 1, wherein producing the general information block comprises producing a block including one or more indicators respectively identifying one or more of the data segments in the series, and wherein transmitting the series comprises transmitting a sub-series of the data segments to the destination computer, beginning with the data segment identified by one of the one or more indicators, responsive to selection of the indicator at the destination computer.

* * * * *